W. L. R. EMMET.
SLOT CLOSING DEVICE FOR DYNAMO ELECTRIC MACHINES.
APPLICATION FILED OCT. 25, 1911.
1,154,496.
Patented Sept. 21, 1915.
Fig.1.
Fig.2.
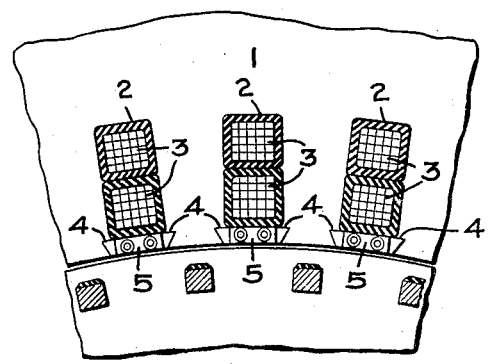
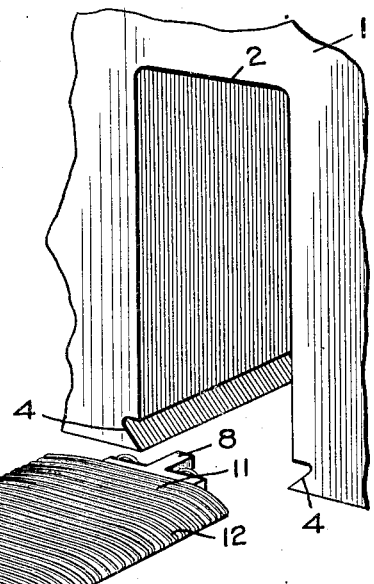
Fig.3.
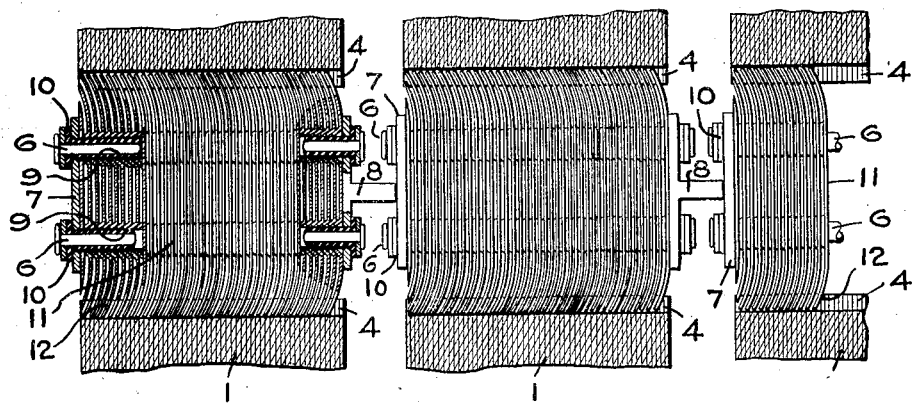
Witnesses:
Adolf Grimm
J. Ellis Glen
Inventor:
William L. R. Emmet
by Albert G. Davis
His Attorney.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

SLOT-CLOSING DEVICE FOR DYNAMO-ELECTRIC MACHINES.

1,154,496.  Specification of Letters Patent.  Patented Sept. 21, 1915.

Application filed October 25, 1911. Serial No. 656,643.

*To all whom it may concern:*

Be it known that I, WILLIAM L. R. EMMET, a citizen of the United States, residing at Schenectady, county of Schenectady, State of New York, have invented certain new and useful Improvements in Slot-Closing Devices for Dynamo-Electric Machines, of which the following is a specification.

My invention relates to slot closing devices for retaining conductors in slots formed in the core structures of dynamo electric machines.

In alternating current dynamo electric machines, it is advantageous to have the surface of the core present as nearly as possible an unbroken area of magnetic material to effect a uniform distribution of the flux, to decrease the reluctance of the air gap, and to reduce the coreloss, by reducing the tooth frequency, that is the frequency of the variation of the flux through the teeth. In order to gain these advantages, the slot closing devices are made of magnetic material.

The various features of my invention are pointed out with particularity in the claims annexed to and forming a part of this specification.

For a better understanding of my invention reference may be had to the following description, taken in connection with the accompanying drawing, in which—

Figure 1 shows a portion of a dynamo-electric machine to which my invention is applied; Fig. 2 is a perspective view showing my slot closing device in the process of being inserted in a slot, and Fig. 3 is a plan view of groups of laminations spaced apart to form ventilating spaces and provided with my wedge.

In Fig. 1, 1 represents the stator of a dynamo-electric machine, provided with a series of slots 2, in which are windings 3. The ends of the teeth which form the walls of the slots are cut away at 4 so as to form seats for the slot closing device 5. My slot closing devices are formed of laminations of magnetic material arranged transversely to the device as a whole. The laminations are assembled on rods 6. Portions of each of the laminations are pressed so as to form a protuberance on one side and an indentation on the other. I preferably form these protuberances about the holes through which the rods 6 pass. The protuberances on one lamination fit into the indentations on the adjacent lamination, whereby the laminations are interlocked and are also slightly spaced apart. I have shown this spacing apart as slightly exaggerated in the drawing. When the requisite number of laminations are in place and the metal member 7 placed across the rods at one end and the T-shaped spacer 8 at the other end, the ends of the rods are upset, so as to hold the laminations tightly together. The rods 6 are surrounded with insulation 9 and the upset ends thereof are separated electrically from the member 7, the spacer 8 and the end laminations by washers of insulation 10. As shown in Figs. 2 and 3, the laminations are curved in the plane of the slot closing device. By spacing the laminations slightly apart, the assembled wedge is made springy. The laminations are substantially straight at their middle portions 11 between the rods, and curved in the plane of the slot closing device at their end portions 12. From Fig. 2, it will be seen that the wedges are inserted in the slots in such a way that the laminations tend to curve still more and release the pressure against the sides of the slot. As soon as the driving pressure is released, the laminations tend to act as a spring and retain the wedges tightly in the slots, or if the metal is not springy, the wedges may be struck so as to tend to straighten the laminations out.

My invention is applicable to many types of dynamo electric machines, but I have found it of particular value in alternating current generators having a smooth core rotor, and for that reason I have illustrated it as applied to such a machine in Fig. 1.

What I claim as new and desire to secure by Letters Patent of the United States, is,

1. A slot closing device for dynamo electric machines comprising laminations of magnetic material arranged transversely to the device as a whole, metal rods, insulation surrounding said rods, said laminations being mounted upon and held together by said rods, and means for slightly separating said laminations from one another.

2. A slot closing device for dynamo electric machines comprising laminations of magnetic material arranged transversely to the device as a whole, metal rods, insulation surrounding said rods, said laminations being mounted upon and held together by said rods, and means provided on said laminations for slightly separating said laminations from one another.

3. A slot closing device for dynamo electric machines comprising laminations of magnetic material arranged transversely to the device as a whole, metal rods, and insulation surrounding said rods, said laminations being mounted upon and held together by said rods, and having indentations and protuberances, said protuberances on one lamination fitting into the said indentations on the adjacent lamination.

4. The combination with a dynamo electric machine having coil retaining slots, of slot closing devices formed of laminations of magnetic material, said laminations being curved in the plane of said devices, and means for slightly separating said laminations from one another.

5. The combination with a dynamo electric machine having coil retaining slots, of slot closing devices formed of laminations of magnetic material, said laminations being curved in the plane of said devices, and means provided on said laminations for slightly separating said laminations from one another.

6. The combination with a dynamo electric machine having coil retaining slots, of slot closing devices formed of laminations of magnetic material, said laminations being curved in the plane of said devices and having indentations and protuberances, said protuberances on one lamination fitting into said indentations on the adjacent lamination.

7. As an article of manufacture, a slot closing device for dynamo electric machines consisting of a transversely laminated bar of magnetic material, the laminations being curved in the plane of said bar and having indentations and protuberances, said protuberances on one lamination fitting into the said indentations on the adjacent lamination.

8. A slot closing device for dynamo electric machines comprising rods, laminations of magnetic material mounted upon and held together by said rods, said laminations being curved in the plane of said device, and means for slightly separating said laminations from one another.

9. A slot closing device for dynamo electric machines comprising rods, laminations of magnetic material mounted upon and held together by said rods, said laminations being curved in the plane of said device, and means provided on said laminations for slightly separating said laminations from one another.

10. A slot closing device for dynamo electric machines comprising rods, laminations of magnetic material mounted upon and held together by said rods, said laminations being curved in the plane of said device, and having indentations and protuberances, said protuberances on one lamination fitting into said indentations on the adjacent lamination.

11. A slot closing device for dynamo electric machines comprising laminations of magnetic material arranged transversely to the device as a whole, metal rods, insulation surrounding said rods, and a T-shaped spacer, said laminations and said spacer being mounted on and held together by said rods.

In witness whereof, I have hereunto set my hand this 24th day of October, 1911.

WILLIAM L. R. EMMET.

Witnesses:
HELEN ORFORD,
MARGARET E. WOOLLEY.

Copies of this patent may be obtained for five cents each, by addressing the "Commissioner of Patents, Washington, D. C."